Figure 1:
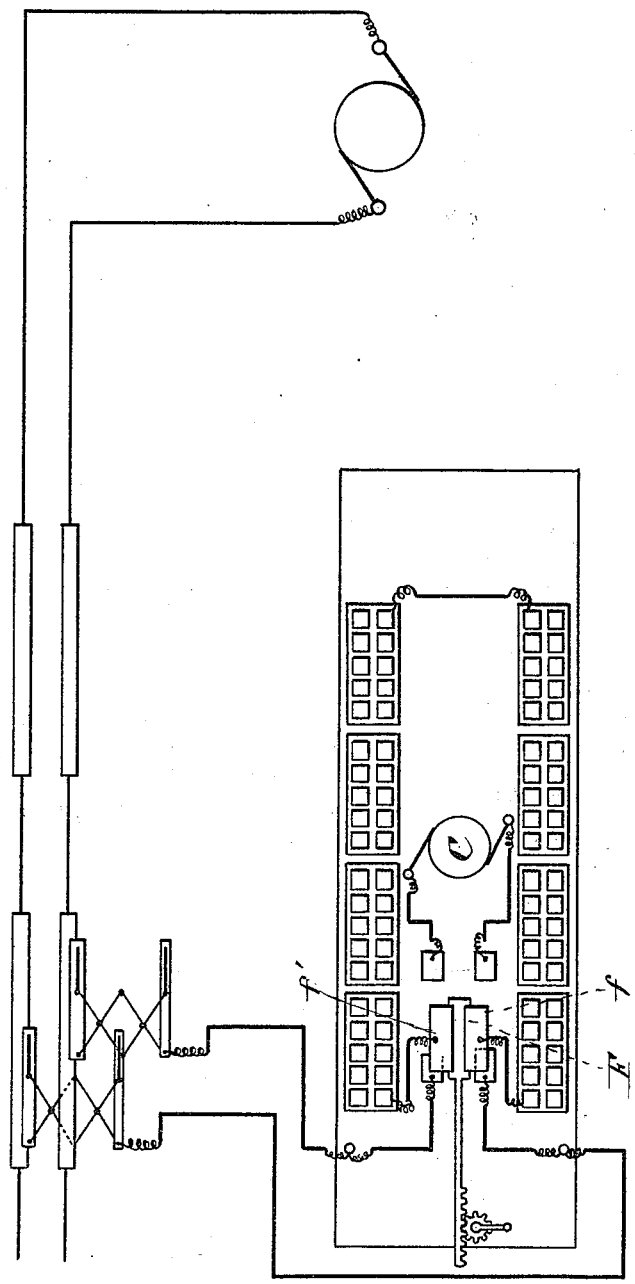

(No Model.)  J. K. P. NOURSE.  3 Sheets—Sheet 1.
ELECTRIC RAILWAY.

No. 440,362.  Patented Nov. 11, 1890.

WITNESSES
John H. Taylor.
Ellen B. Tomlinson.

INVENTOR.
James K. P. Nourse
By Alex. P. Browne, attorney.

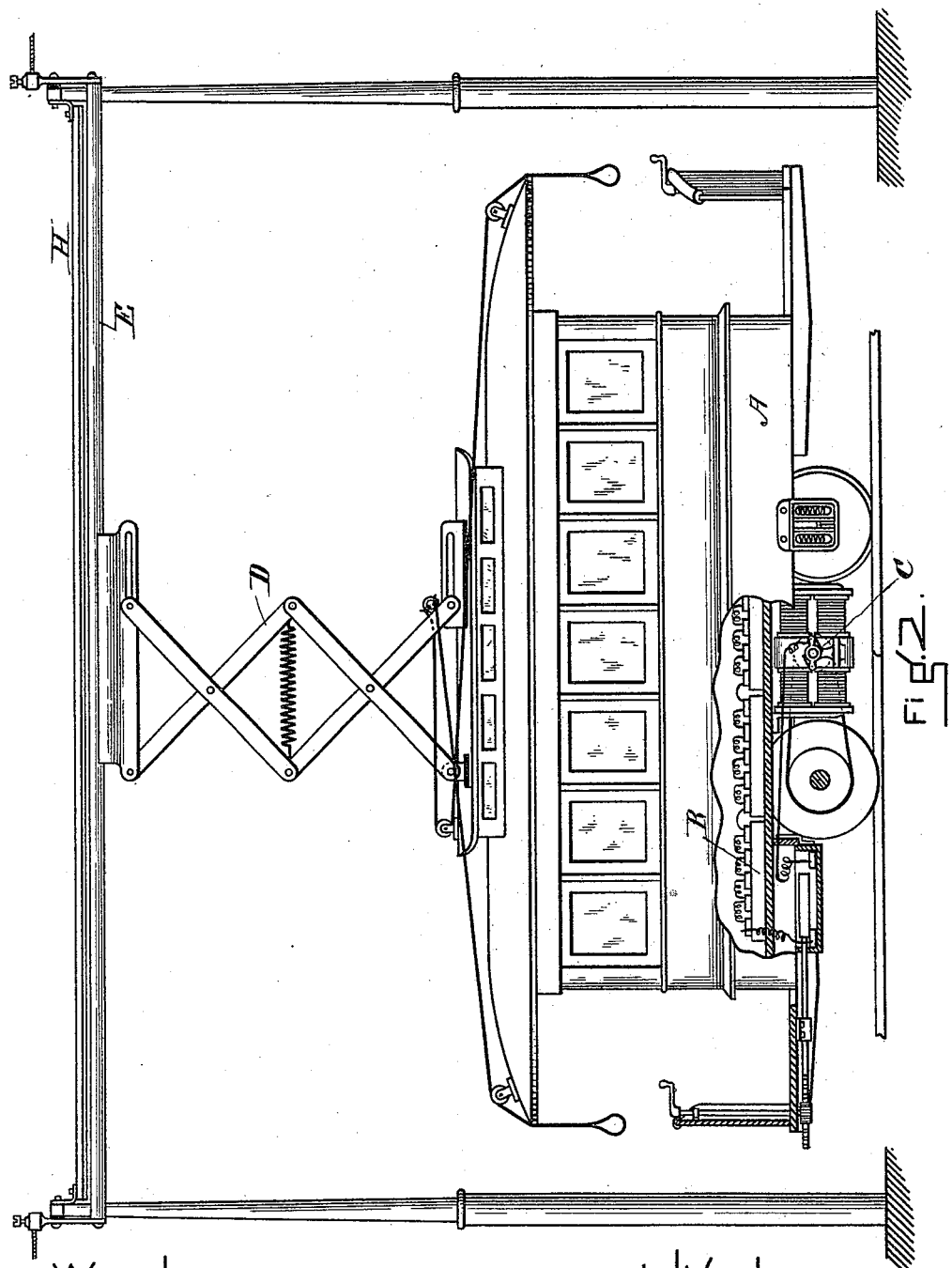

(No Model.) 3 Sheets—Sheet 3.
J. K. P. NOURSE.
ELECTRIC RAILWAY.
No. 440,362. Patented Nov. 11, 1890.
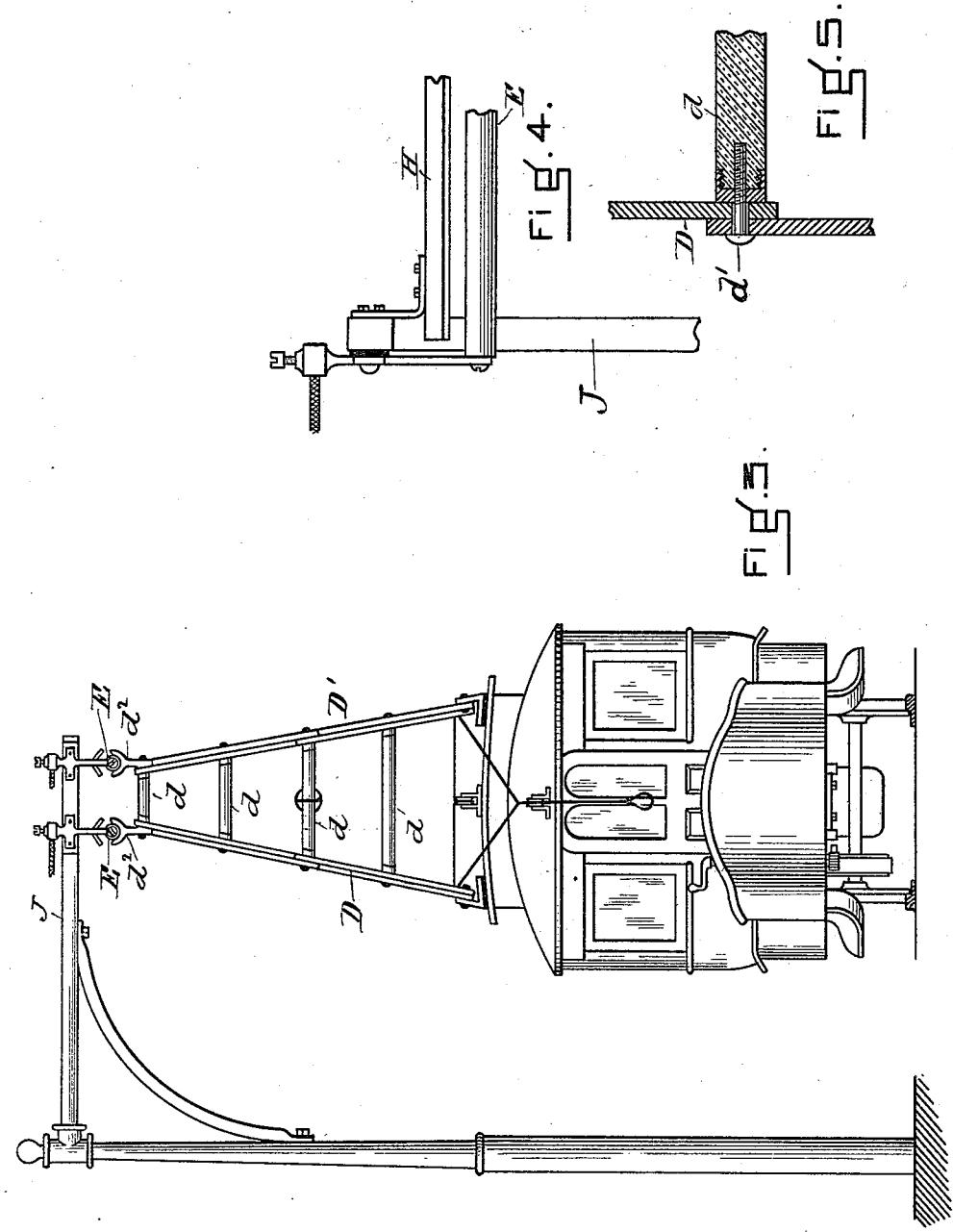
WITNESSES
John H. Taylor
Ellen B. Tomlinson
INVENTOR.
James K. P. Nourse
by Alex. P. Browne
attorney.

UNITED STATES PATENT OFFICE.

JAMES K. P. NOURSE, OF BOSTON, MASSACHUSETTS, ASSIGNOR TO HIMSELF, LUTHER DANIELS, OF SAME PLACE, AND JOHN A. FOGG, OF SOUTH WEYMOUTH, MASSACHUSETTS.

ELECTRIC RAILWAY.

SPECIFICATION forming part of Letters Patent No. 440,362, dated November 11, 1890.

Application filed March 18, 1890. Serial No. 344,326. (No model.)

*To all whom it may concern:*

Be it known that I, JAMES K. P. NOURSE, of Boston, in the county of Suffolk and State of Massachusetts, a citizen of the United States, have invented certain new and useful Improvements in Electric Railways, of which the following is a specification.

My invention relates to that class of electric railways in which electrical energy for the propulsion of the vehicle is derived from storage-batteries carried thereon. Heretofore it has been customary with this class of vehicles to charge the batteries once for all at a terminal station, the amount of battery-charge being intended to be sufficient to propel the vehicle throughout its entire route, which usually ends at the place of beginning or where the charging is done. According to another method heretofore in use it has been customary to propel vehicles upon such railways by means of electric power conveyed from a central generator by means of a wire arranged above the line of said railway with an electrical connection constantly interposed between the conductor and the vehicle, so that current from the generator is constantly passing to the motor of the vehicle to propel the same.

My improved electric-railway system is made up in part of each of these methods, but as I believe has many advantages not possessed by them, and is at the same time free from the defects and difficulties which have heretofore been observed in their use.

My improved system embraces as its essential features a vehicle provided with an electric motor and storage-batteries, a conductor of electricity leading from a central station or generator and at intervals passing in proximity to the line of travel of the said vehicle, although not necessarily or ordinarily following that line of travel, and a connection, substantially as herein described, adapted to form a path for the current from the generator to the storage-battery on the vehicle when connection is established between them at one of the points previously mentioned where the electrical conductor meets the line of travel of the vehicle.

In the accompanying drawings I have represented in diagram at Figure 1 a system embracing the features above described; at Fig. 2, a view in side elevation of an electric car provided with a motor and storage-batteries, a connection made vertically extensible from the car, and a current-conductor above the same with which said extension may connect, in order that current may pass from the source of electricity to the storage-batteries to charge them. Fig. 3 is an end view of the same device; and Figs. 4 and 5, detail views, on an enlarged scale, of small portions thereof, as will be hereinafter more fully explained.

I will now proceed to describe the specific form of device shown in the drawings, in which my present invention is embodied in the form now best known to me.

In the drawings, A represents the car, B its storage-batteries, and C its electrical motor. These parts may be of any approved construction capable of carrying out the desired operation, as hereinafter more fully explained.

D represents an extensible connection carried with the car, and E overhead wires constituting a metallic circuit through which the current from the main generator flows. Referring to the diagram, Fig. 1, it will be seen that of this circuit E E the only portion that is required to be bare or free from insulation will be those portions at which, as shown in the other figures, connection is made between the wire and the car. It follows, therefore, that all the rest of the current-carrying wire may be insulated to any degree required.

The particular form of connection between the car and the current-carrying wire, which I have shown in the drawings, consists of a lazy-tongs extension adapted to be operated from the car-platform by means of cords made fast to the end of one member of the lazy-tongs, the corresponding end of the other member being connected to the car. It is obvious that by moving one of these members toward or away from the other the contact devices carried by the lazy-tongs may be drawn down upon the car or may be carried up to bear against the current-carrying wire. As the object of this connection is to charge the storage-batteries from this wire, it is obvious that the connection should be double, as shown in Fig. 3, and its two portions insulated from each other, as shown at D D', which in this case are represented as suitably insulated from each other by constructing cross-braces D between them of insulated material. A detail of this construction is shown at Fig. 5, a metallic bolt $d'$ passing through the arms D of the lazy-tongs and being screwed into the insulating cross-brace $d$. The upper extremity of each of the arms D D' is provided with a shoe $d^2$ of a form to engage with one of the conductors E, certain portions of which, as have been explained, are free from insulation or made bare for this purpose. The arms D D' are also provided with suitable electrical connections properly insulated and carried down to a switch F, (represented in the diagram, Fig. 1,) whereby they can be thrown into or out of connection with the terminals of the storage-battery of the vehicle. This same switch F may, for convenience, be employed, as represented in the diagram, to connect the terminals of the switch-battery to the terminals of the motor C, the switch carrying for this purpose contacts $f f'$, suitably insulated from each other, which will connect with the terminals, either of the connections coming from the arms D or those of the connections leading to the motor, according as the switch is in one or the other of its positions.

The plan of operation of my improved system is substantially as follows: In connection with the ordinary track or way usually employed for electric vehicles, I provide at some convenient point a suitable power-house or main electrical generator from which I carry the current-carrying circuit. This circuit does not, either of necessity or preference, follow the route of the way or road, and therefore may be entirely free from curves. All that is essential is that at points suitably distant from one another upon the line of the road the current-carrying circuit shall be brought near to it and within the reach of the vehicle. At these points convenient lengths of the conductor are left uninsulated; but the rest of the conductor may be insulated throughout. Each of these points or stations will then constitute a supply-station, at which, when the car arrives, a connection between the storage-batteries carried by it and the main conductor will enable the batteries to be quickly charged with current sufficient to propel the vehicle over its course to the next station, where the operation may be repeated. It is obvious when the batteries are so electrically connected that the current-wire for charging the motor shall be disconnected from the source of electricity, in order that the vehicle may be at rest while its batteries are receiving their charge of the current, and for this a suitable switch should be provided, whereby the terminals of the storage-batteries may be brought into electrical connection either with the current-wire or with the motor on the car, as is required.

A suitable guard should be provided in connection with the exposed portions E of the current-wire to prevent accidental contact between them and other wires, which are "dead" or otherwise, and I have shown at Fig. 4 such guards H arranged above the current-wire E, upon the brackets J, by which in practice they may be conveniently suspended over the track where the stations occur. At other points throughout their length current-wires may be carried either over head or under ground and upon any suitable supports.

I have thus far described the operation of my system when one and the same car is caused to travel past and take its current from a series of stations formed upon the conductor-wire; but in suburban districts or in other places where it is desirable to increase the distance between stations and the length of run, a car fitted in accordance with my invention may be kept in waiting at any given station upon a side track while its batteries receive their current-charge, and into this car the passengers from another car coming up may be transferred, the other car being left upon the side track to be charged in like manner, and the charged car proceeding with its load of passengers to the next station. As in this way a much greater length of time is available for charging the car, it is obvious that it may be provided with batteries of greater capacity which may be charged to a greater extent, thus fitting the car for a longer run before its power is exhausted.

I claim—

1. The combination, with a car or vehicle provided with an electric motor and storage-batteries for operating it, of a track or way upon which the car may be run, a suitable power-station, a continuous electric circuit extending therefrom and meeting the said track or way at suitable points thereon, an extensible connection carried by the car and adapted to be raised therefrom to engage with bare or uninsulated portions of the said conductor, and a suitable switch whereby the terminals of the said storage-battery may be disconnected from the motor and connected with the terminals of the said extensible connection, substantially as and for the purpose set forth.

2. In combination, the car A, provided with storage-batteries B and motor C, the extensible lazy-tongs connection D D', insulated from each other, as described, shoes $d^2$, carried by the said lazy-tongs, and the conductor-wires E E, suitably supported above the said car, as described.

In testimony whereof I have hereunto subscribed my name this 12th day of March, A. D. 1890.

JAMES K. P. NOURSE.

Witnesses:
JOHN H. TAYLOR,
ELLEN B. TOMLINSON.